United States Patent [19]
Kaak

[11] 3,865,227
[45] Feb. 11, 1975

[54] MULTI-FLOOR CONVEYOR AND STORAGE APPARATUS

[76] Inventor: Stephanus W. Kaak, Rijksstraatweg 273, Gaanderen, Netherlands

[22] Filed: Aug. 20, 1973

[21] Appl. No.: 389,981

Related U.S. Application Data

[63] Continuation-in-part of Ser. No. 224,558, Feb. 8, 1972, abandoned.

[52] U.S. Cl. .................................. 198/84, 198/136
[51] Int. Cl. ............................................ B65g 37/00
[58] Field of Search ......... 214/16.1 A; 198/84, 136, 198/159, 171, 181, 212; 193/12, 355

[56] References Cited
UNITED STATES PATENTS

| | | | |
|---|---|---|---|
| 1,215,212 | 2/1917 | Souder | 198/136 X |
| 3,124,237 | 3/1964 | Schommer | 198/181 |

Primary Examiner—Evon C. Blunk
Assistant Examiner—Douglas D. Watts
Attorney, Agent, or Firm—Kurt Kelman

[57] ABSTRACT

A multi-floor conveyor and storage apparatus is disclosed for articles such as bread or the like. The conveyor and storage apparatus comprises, on each floor or level, a plurality of communicating conveyors associated and arranged to form a closed conveying track for the articles being stored and conveyed. The width of each level of the conveyors is a multiple of the width of the conveyed articles. At one location on the closed track, there is provided an article receiving end to which articles are supplied, and at another location there is provided an article discharge end where the articles are discharged. Articles are displaced on each level perpendicularly in a cycle by a distance equal to the width of the article.

5 Claims, 9 Drawing Figures

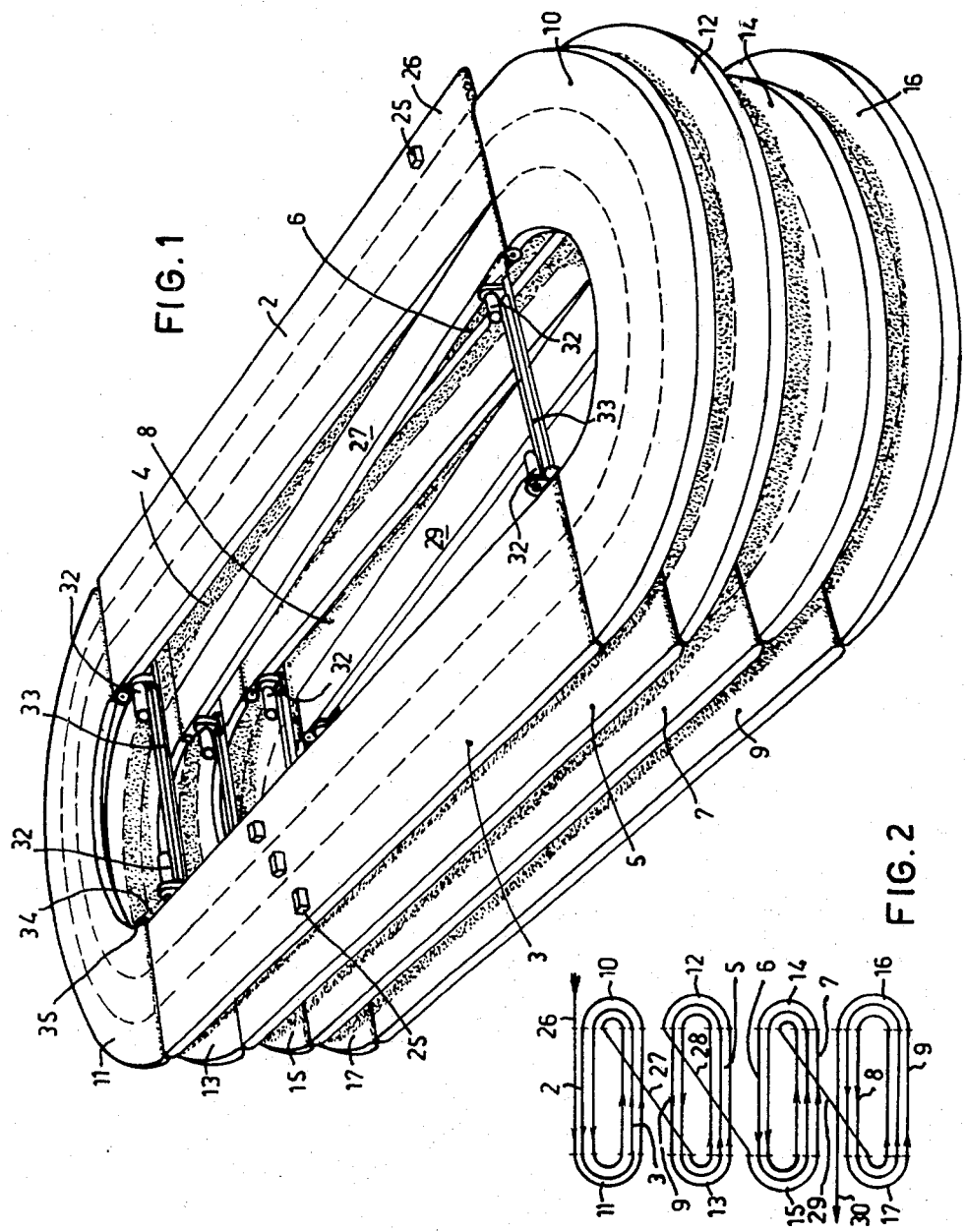

MULTI-FLOOR CONVEYOR AND STORAGE APPARATUS

This application for U.S. Letters Pat. is a continuation-in-part of application Ser. No. 224,558, filed Feb. 8, 1972, now abandoned.

The present invention relates to improvements in a multi-floor conveyor and storage apparatus for articles of a predetermined width, such as bread.

Temporary storge devices have been used, for instance, in bakeries where bread from an oven is temporarily stored prior to being guided to other apparatus for further processing. Before bread may be subjected to such further processing, it must be cooled for about an hour and a half, thus requiring a space-consuming storage area. If a conveyor is used, the relative speed should be at least equal to that at which bread is discharged from the oven, i.e., it constitutes a fixed value. Thus, with the conveying speed and the storage time being predetermined, the resultant size and speed of the conveying and storage track are equally determined. Using prior art techniques, the resultant size of such a conveyor and storage apparatus will be considerable when it is realized, for instance, that 4,000 loaves of bread per hour may be discharged from an oven under normal bakery conditions.

It has now been found that by practice of the present invention, there is provided an apparatus which conveniently stores and conveys large volumes of articles such as bread between an oven and further processing locations without requiring an excessively large structure while producing bread of uniform high quality.

The capacity of the present apparatus is increased while its size is decreased in accordance with this invention by providing, on each level, a plurality of communicating conveyors associated and arranged such to form a closed conveying track for the articles, each conveyor having a width about equal to the width of the article. One of the conveyors on each level has an article receiving end to which articles are supplied, and another conveyor on each level in communication with the conveyor receiving end, has an article discharge end where articles are discharged. Between the receiving end and the discharge end, articles are displaced perpendicularly on each cycle about the level in respect to adjacent conveyors by a distance substantially equal to the width of the article.

Generally stated, the present invention provides an apparatus having a multiple number of floors or levels, each of which defines a closed track having an article receiving location and an article discharging location. These respective locations are in communication by means of a number of conveyors each of which has a width slightly greater than a multiple of the width of the articles being conveyed. Also, each level between a first and last level, i.e., intermediate closed tracks, are joined by a vertically descending conveyor which connects the article discharge location of one level with the article receiving location of the subsequent level. With a multi-floor conveyor and storage apparatus of this type, each article supplied at the receiving end of a first conveyor circulates over the closed conveying track several times on each floor level before it reaches the discharge end, then to the vertically descendiing conveyor to the receiving location of a subsequent level where the article again repeats the circuit of the prior level except in the opposite relative perpendicular direction. In other words, the article circulates over a closed loop of diminishing diameter on one floor level until it is finally discharged therefrom, and in a closed loop of increasing diameter on the subsequent level until it is also discharged. This pattern is repeated until ultimately, after a designated storage period on the present conveyor, the articles are discharged from the present apparatus for further processing.

Although the width of the conveyors is increased to a multiple of the width of the article to be conveyed and stored, the area occupied by the apparatus is nevertheless relatively small since the communicating conveyors comprise two straight conveyors interconnected by arcuate conveyors of small radii so as to form a track on each level defined by an oblong loop. Several floors or levels of superposed conveyors of this type, i.e., oblong loop, will provide a storage capacity per volume of the apparatus which greatly exceeds that of known devices while occupying significantly less space.

Further advantages and features of this invention will become more readily apparent in the following detailed description of preferred embodiments thereof, taken in conjunction with the drawings wherein:

FIG. 1 is a perspective view of the multi-floor conveyor and storage apparatus according to one embodiment of the present invention;

FIG. 2 is a loop diagram of the path followed by articles in the apparatus of FIG. 1;

Figure 3:
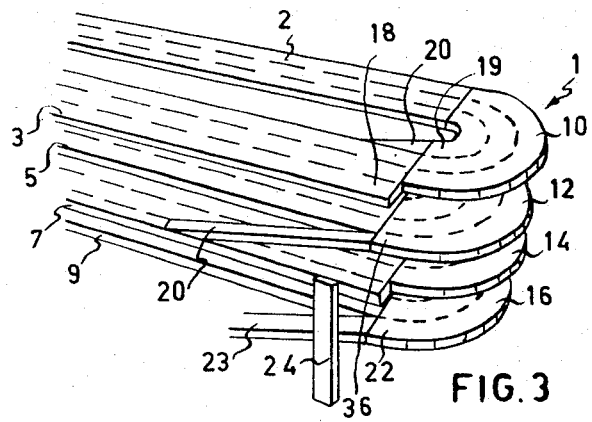
FIG. 3 is a partial perspective view of a multi-floor conveyor and storage apparatus similar to that of FIG. 1.
Figure 4:
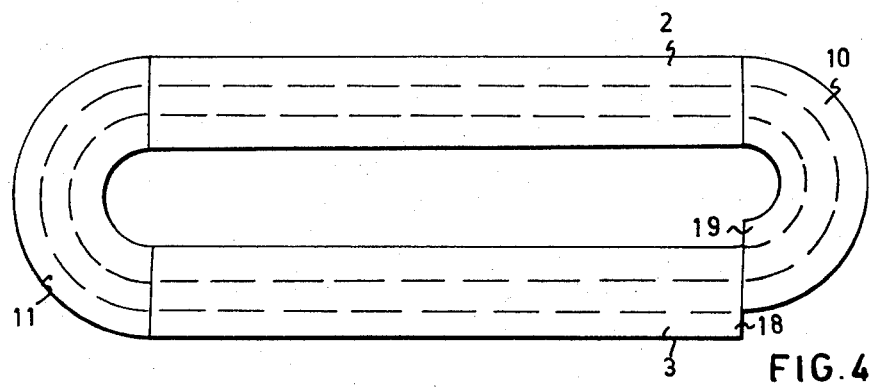
FIGS. 4 to 7 are plan views of the successively lower floor levels of associated conveyors of the apparatus of FIG. 1, the straight conveyors being parallel to each other.
Figure 5:
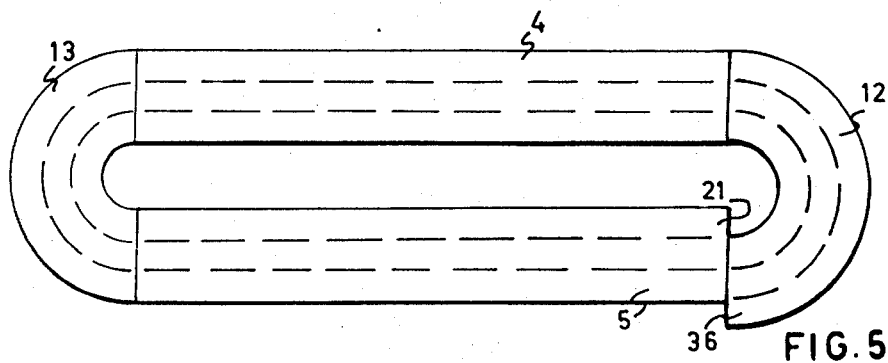
Figure 6:
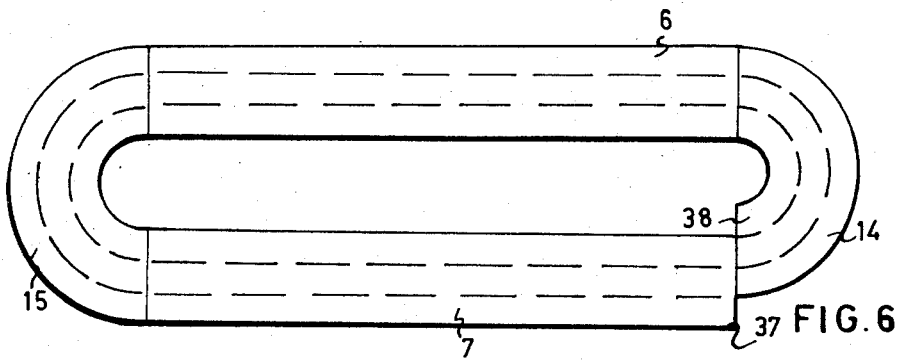
Figure 7:
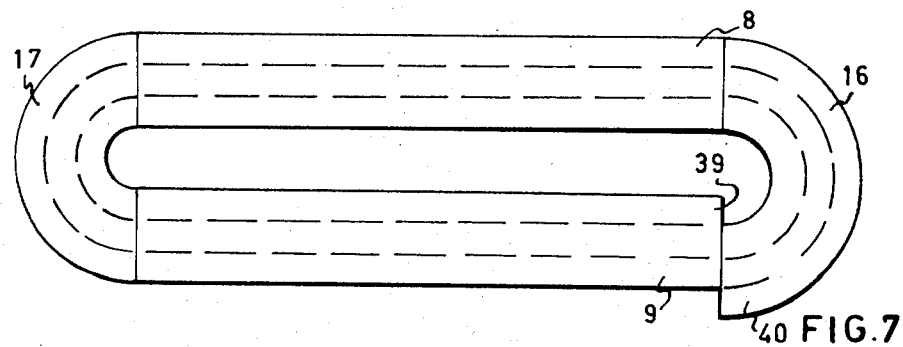

Referring now to the drawing, wherein like reference numerals indicate like parts functioning in a like manner in all figures, FIG. 1 shows a conveyor and storage apparatus 1 comprising four floors or levels of conveyors, each level consisting of a plurality of communicating conveyors associated and arranged to form a closed conveying track for articles to be supplied from a receiving location of one of the conveyors to a discharge location.

In the illustrated embodiment, each floor level comprises two straight conveyors 2 and 3, 4 and 5, 6 and 7, and 8 and 9 respectively. These straight conveyors are interconnected by intermediate arcuate conveyors 10 and 11, 12 and 13, 14 and 15, and 16 and 17 respectively such to shift the article laterally at a junction during its travel.

It will be clear from FIGS. 1 and 2 that articles 25 such as a loaf of bread enter the present apparatus such as at location 26, in a direction perpendicular to the length thereof relative to the direction of travel. Because of the nature of the illustrated level defined by conveyors 2, 11, 3 and 10, the article 25 passes along a path of diminishing diameter until it reaches vertically descending conveyor 27. Now, article 25 passes on conveyor 27 to a subsequent level defined by conveyors 4, 13, 5 and 12 at an article entry location along an inner track loop. At the second level, the article travels a path of increasing diameter until the article reaches a second vertically descending conveyor 28. Here, article 25 passes from the greatest loop of the second floor level to the greatest loop of the third floor level defined by conveyors 6, 15, 7 and 14 respectively.

From the third level, and upon reaching the shortest loop, article 25 passes along a third vertically descending conveyor 29 to the fourth floor level defined by conveyors 8, 17, 9 and 16 respectively. When article 25 has made the required loops along the fourth floor level, it is discharged along line 30 to a further processing location.

The number of floor levels and the width of each conveyor which must be a multiple of the length of the article, i.e., the greatest measurement of the bread, and may vary in number as desired, depending upon the speed of the conveyors which are all the same, and the time of storage desired for the articles while being conveyed.

It will be appreciated that all of the conveyors are maintained at the same speed by means of motors 32 which may be supported by beams 33. Motors 32 may drive the conveyors by chain 34 and sprocket 35.

The nature and composition of the conveyors may vary as desired. For bread processing, it is advantageous to use a metal screen type conveyor and especially about the arcuate portions where contracting features permit arcuate travel along a continuous conveyor. A wide variety of conveyor surfaces may be employed herein provided that the essentials of the present invention as expressed in FIGS. 1 and 2 are maintained, and that the conveyors forming the various floor levels all convey articles at the same speed.

Thus, in the present apparatus, each floor level is defined by straight and arcuate conveyors on each floor which form a closed loop or conveying track, extending spirally. The width of the track corresponds to the greatest length of the article to be conveyed and stored. This feature permits a shorter total path although using tracks of larger dimension.

Except for movement in an opposite clockwise direction, the embodiment of FIG. 3 with related FIGS. 4–7 duplicate the features discussed with regard to FIGS. 1 and 2.

Accordingly, as will be appreciated from a combined consideration of the figures, and especially FIG. 3, an article such as a loaf of bread is supplied to a receiving end 18 of a first conveyor 3 on the highest floor of the apparatus and is entrained by this conveyor to associated conveyor 11 where it moves onto conveyor 2 which moves the article to associated conveyor 10. This conveyor has a discharge end 19 where the article leaves this floor and is transported through a vertically descending conveyor 20 to the receiving end 21 of conveyor 5 on the next lower floor. Although the floor transfer means is illustrated as a conveyor 20, it could be a conveyor belt or any other suitable transport means, as desired. On this floor, the article is conveyed over a spiral track of increasing diameter (see FIG. 5) to discharge end 36 of conveyor 12 where it is similarly transferred to the next lower floor, i.e., conveyor 20, where it is received at end 37 of conveyor 7 and conveyed to discharge end 38 of conveyor 9 on the lowermost floor (FIG. 7) to be conveyed to discharge end 40 of the conveyor 16 for transfer of the article from the described apparatus to another station for further processing.

The article receiving end of one conveyor to which the articles are supplied on each floor is substantially vertically above the article discharge end of the other conveyor on the floor below.

In the embodiment of FIGS. 1 to 7, the radii of the arcuate tracks followed by the article are so selected, i.e., one is greater than the other, that the straight conveyors have tracks which are all parallel to each other. Since all the conveyors have the same width with one track path staggered transversely in respect of adjacent arcuate paths, at their respective receiving and discharge ends, the radii of conveyors 10, 13, 14 and 17 are smaller than those of conveyors 11, 12, 15 and 16, respectively.

Figure 8:
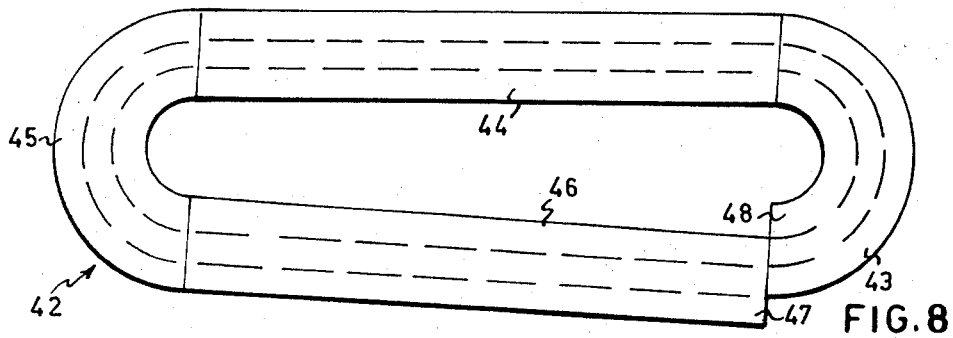
FIGS. 8 and 9 are plan views of the two successively lower floors of associated conveyors of an embodiment apparatus, with the straight conveyors extending obliquely to each other.
Figure 9:
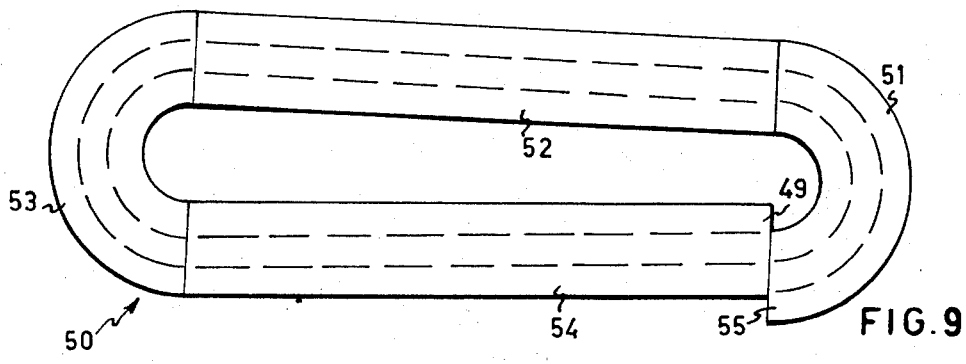

The embodiments of FIGS. 8 and 9 differ only in that the radii of all the arcuate conveyors are identical, which causes the straight conveyors of each conveyor system to be inclined in relation to each other.

Thus, in FIGS. 8 and 9, a first level 42 is formed of arcuate conveyors 43 and 45 which are joined by straight conveyors 44 and 46, the latter being inclined relative to each other. Thus, an article may enter at location 47, pass along a first outer track of conveyor 46 to arcuate conveyor 45, then onto a related track of conveyor 44 to arcuate conveyor 43 and so forth, until discharged at location 48 to a vertically descending conveyor, not shown, except otherwise as conveyor 20, and to location 49 of a subsequent floor level 50. The subsequent floor level is defined by arcuate conveyors 51 and 53 of the same radii, and joined as illustrated by straight conveyors 52 and 54, the latter being inclined relative to each other. The path proceeds as illustrated by dashed lines until discharge at location 55, either to a subsequent level such as one having a pattern of FIG. 8, or otherwise to a further processing location.

The conveyor systems of the multi-floor apparatus are mounted on columns 24, FIG. 3. The velocity, i.e., speed, of all the conveyors is equal and may be adjusted to the velocity with which the articles are received on the highest floor and/or discharged on the lowest floor. A common drive shaft can be used for moving all the conveyors with power being received from a single drive. In this instance, the multiple number of motors 32 of FIG. 1 need only be substituted by a common drive shaft ultimately joined by any one of numerous means within the skill of the art to a common driving source.

While the conveyor systems have been illustrated in the form of oblong loops, different conveying track shapes are possible, the only requirement being the transversely staggered relationship of adjacent conveyors are their respective receiving and discharge ends. Also, while the described conveyor and storage apparatus will be particularly useful for handling freshly baked loaves of bread, it may obviously be used for any purpose where it is desired to store articles temporarily while conveying them from one point to another. The number of superposed floors will be determined by the required storage time. When fewer floors are required, the storage time is shorter and the discharge may simply be connected to a discharge location at a higher floor, thus eliminating the use of the lower floors of the apparatus.

It is understood that the foregoing detailed description is given merely by way of illustration and that many variations may be made therein without departing from the spirit of this invention as defined.

What is claimed is:

1. A multi-floor conveyor and storage apparatus for articles having a predetermined width, comprising on each floor level a plurality of communicating conveyors shifted laterally at a junction, all being associated, each having a drive means and the same velocity and arranged in a horizontal plane to form a conveying track for the articles, said communicating conveyors being disposed to convey articles in a laterally changing horizontal path, the conveyors having a width which is a multiple of the width of the articles, each conveyor having two ends abutting adjacent ends of the other conveyors, one of the conveyors having an article receiving end to which the articles are supplied, another one of the conveyors having an article discharge end where the articles are discharged to a vertically descending conveyor for transfer to a subsequent floor level, the one conveyor being displaced perpendicularly to the track in respect of the other conveyor by a distance substantially equal to the width of the articles.

2. The multi-floor conveyor and storage apparatus of claim 1, wherein the plurality of communicating conveyors on each floor comprises two straight conveyors and two arcuate conveyors, the arcuate conveyors being intermediate the straight conveyors.

3. The multi-floor conveyor and storage apparatus of claim 2, wherein the radii of the arcuate conveyors are so selected that the straight conveyors are substantially parallel to each other.

4. The multi-floor conveyor and storage apparatus of claim 2 wherein the radii of curvature of the arcuate conveyors are substantially equal.

5. A multi-floor conveyor and storage apparatus for articles of bread or the like having a predetermined width, said apparatus comprising in combination, a plurality of floor levels, a first level having an article receiving location and a last level having an article discharging location, each floor level having a horizontally disposed plurality of communicating conveyors shifted laterally at a junction, associated and arranged to form a conveying track for carrying said articles, said communicating conveyors being disposed to convey said articles in a laterally changing horizontal path, the conveyors having a width which is a multiple of the width of the articles and defining an article transport track for supporting movement of articles in a continuously closing path on one floor level and a continuously expanding path on a subsequent level, each floor level having a vertically descending article transfer means to a subsequent floor level, and drive means for moving all the conveyors at the same velocity.

* * * * *